March 3, 1942.  H. NUTT  2,275,158
CLUTCH OPERATING MECHANISM
Filed Feb. 10, 1940
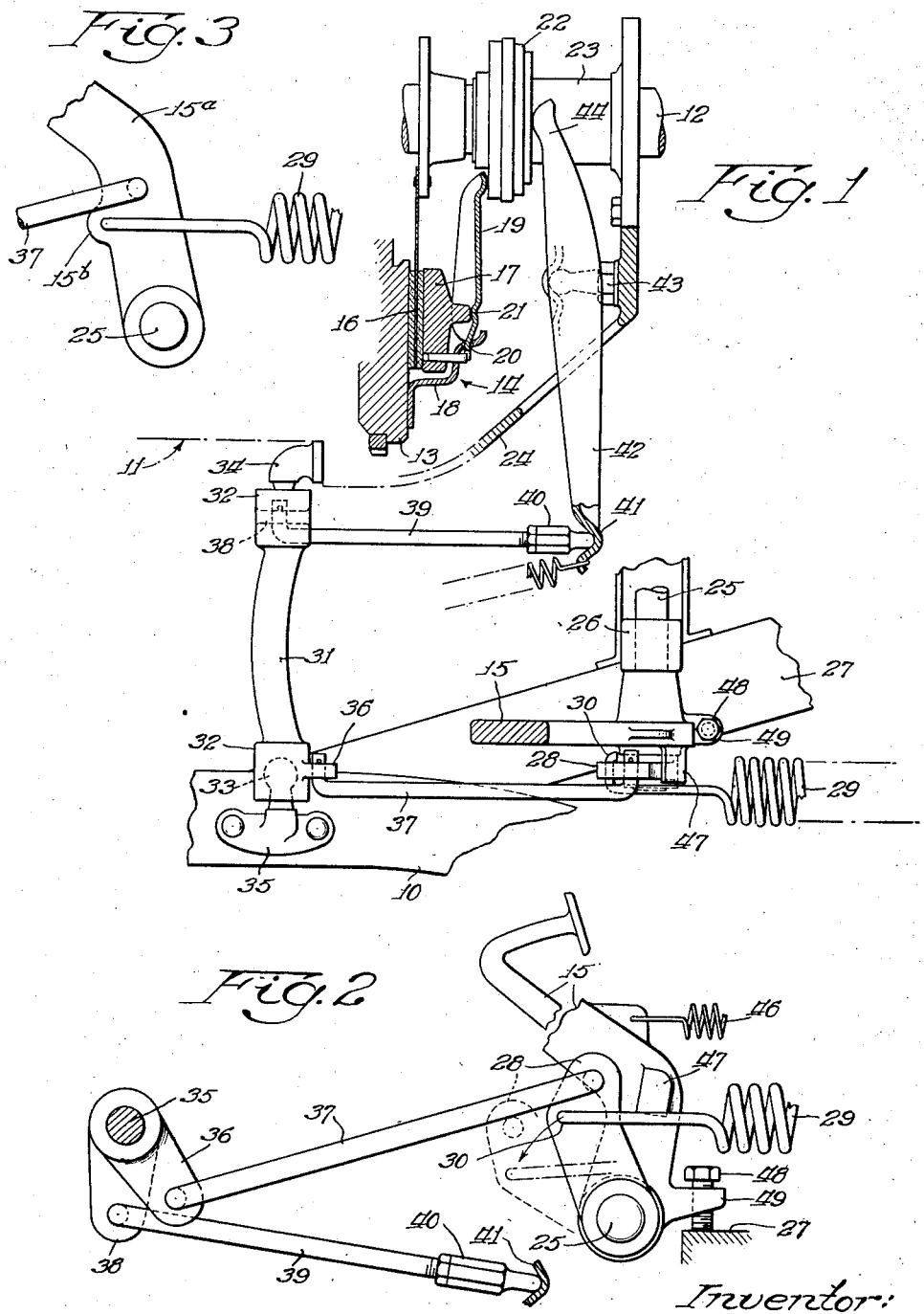
Inventor:
Harold Nutt
By: Edward C. Gritzbaugh
Atty.

Patented Mar. 3, 1942

2,275,158

UNITED STATES PATENT OFFICE 2,275,158

CLUTCH OPERATING MECHANISM

Harold Nutt, Chicago, Ill., assignor to Borg-Warner Corporation, Chicago, Ill., a corporation of Illinois Application February 10, 1940, Serial No. 318,334

8 Claims. (Cl. 192—89)

My invention relates to clutch operating mechanism for clutches of the type wherein engagement pressure is derived from a spring exterior of the clutch, and has as its object to provide an arrangement of clutch packing spring and linkage for transmitting the pressure of said spring to the clutch, wherein the effective turning moment of the spring against the linkage decreases during clutch release, and wherein the linkage is arranged to transmit the opposing pressures of the clutch pedal and the clutch packing spring, both mounted on the frame of a vehicle, to a clutch which is supported in cushioned mountings allowing relative movement between the clutch and frame, the linkage being adapted to accommodate such movement without interfering with the transmission of clutch releasing pressure.

Other objects, the advantages and uses of the invention will become more apparent after reading the following specification and claims and after consideration of the drawing forming a part of the specification, wherein:

Fig. 1 is a plan view, partly in section, of a clutch operating mechanism embodying my invention;

Fig. 2 is a side elevation of the same; and

Fig. 3 is a side elevation of a modification of the invention.

As an example of one form in which the invention may be embodied, I have shown in the drawing portions of a motor vehicle including a frame 10 and a power plant and transmission unit, indicated generally at 11, which may be mounted upon conventional cushioned mountings (not shown) in the frame 10. A transmission shaft 12 is adapted to be connected to a driving member such as the flywheel 13 of the power plant, through the medium of a clutch 14 under the control of a clutch release pedal 15.

The clutch 14 may be of the type shown in my U. S. Letters Patent 2,248,378, issued July 8, 1941. It includes the flywheel 13, a driven member 16, an annular fulcrum member 18 secured to the flywheel 13, and engagement levers 19 fulcrumed at their outer ends as at 20 in the fulcrum member 18 and having thrust transmitting association as at 21 with the pressure plate 17.

The inner ends of the levers 19 are adapted to receive thrust from the thrust bearing 22 slidably mounted on a sleeve 23 through which the driven shaft 12 extends. The sleeve 23 may form a portion of the housing 24 in which the clutch 13 is encased.

The pedal 15 may be mounted on a shaft 25 journaled in bearings 26 secured to a diagonal thrust member 27 of the vehicle frame.

The pedal 15 forms part of a pedal assembly including an arm 28 mounted on the shaft 25 and adapted to transmit to the clutch the opposed forces of clutch release furnished by the pedal 15, and clutch engagement, furnished by a spring 29 one end of which is hooked into the arm 28 as at 30 and the other end of which is attached to the vehicle frame.

These opposed forces are transmitted to the clutch through linkage including a transverse rock shaft 31 having universally pivotal connections at its respective ends with the power plant and transmission unit 11 and the frame respectively. To this end the shaft is formed at its ends with sockets 32 receiving the spherical heads 33 of brackets 34 and 35 attached to the unit 11 and to the frame respectively. The outer end of the rock shaft 31 is provided with a downwardly projecting arm 36 which is linked to the arm 28 by a push rod 37. The inner end of the rock shaft 31 is provided with a downwardly projecting arm 38. A push rod 39 has one end pivoted to the arm 38 and its other end is provided with an adjustable head 40 which is engaged in a socket 41 in one end of a transmitting lever 42. The intermediate region of the lever 42 is fulcrumed upon a post 43 secured in the clutch housing 24, and the opposite end of the lever 42 is formed with a fork 44 which embraces the sleeve 23 and is engaged against the thrust bearing 22.

The invention contemplates that the spring 29 and link 37 may be connected directly to the pedal 15, as shown in Fig. 3, wherein the pedal is indicated at 15a, being formed with an extension 15b to which the spring 29 is attached. However, it is preferred to employ the arrangement shown in Figs. 1 and 2 wherein the pedal 15 may, under the pull of a small auxiliary spring 46, move rearwardly somewhat beyond the position corresponding to the fully engaged position of the clutch, a lost motion connection being thus formed between the pedal 15 and the arm 28. This is accomplished by mounting either the pedal 15 or the arm 28 loosely upon the shaft 25 and forming the pedal 15 with a lug 47 which is adapted to engage the upper end of the arm 28 for transmitting movement thereto. In the arrangement shown, the pedal 15 is loosely mounted on the shaft 25 and is retained in position between the bearing 26 and the arm 28, the latter being secured to the shaft 25.

The rearward limit of movement of the pedal 15 is determined by a set-screw 48 threaded through a lug 49 on the pedal 15 and engageable with the frame 27. The amount of lost motion is determined by the space between the lug 47 and the arm 28 when the pedal is at such rearward limit of movement, and may be adjusted by means of the set-screw 48.

The lost motion in the pedal movement improves the operation from the the operator's standpoint.

In the operation of a clutch mechanism embodying the invention, the clutch is normally engaged by pressure transmitted from the spring 29 through the arm 28, the link 37, the rock shaft 31, the link 39, the lever 42, the bearing 22, and the levers 19. When the pedal 15 is depressed, the load of the spring 29 is removed from the linkage 37, 31, etc., and transferred to the pedal 15, and the pressure plate 17 is allowed to recede under the pressure of a suitable retractor spring or springs. Thus the clutch is released.

The direction of pull of the spring 29 is so related to the longitudinal axis of the lever arm defined (in the arm 28 in Fig. 2, and in the pedal 15 in Fig. 3) between the point of attachment of the spring 29 and the axis of the shaft 25, that the spring load on the pedal will decrease throughout pedal depression.

I claim:

1. Mechanism for operating a friction clutch of a vehicle having a frame and a power plant and transmission unit of which the clutch forms a part, comprising a spring external of the clutch for providing clutch engaging force, manually controlled means for releasing the clutch against the action of said spring, one end of said spring acting directly against said releasing means, and a transverse rock shaft having universally pivotal connections at its respective ends with the frame and said unit respectively, and having lever arms at its respective ends connected respectively to said releasing device and to said clutch, said spring being so arranged relative to said manually controlled means that the effective lever arm to which the spring pressure is applied, decreases during clutch release.

2. Mechanism for operating a friction clutch of a vehicle having a frame and a power plant and transmission unit of which the clutch forms a part, comprising a clutch release pedal, pivoted to the frame, a pedal arm having a lost motion torque receiving connection with said pedal, a clutch engaging spring attached at one end to said arm and at its other end to the frame, and a transverse rock shaft having universally pivotal connection at its respective ends with the frame and said unit respectively, said rock shaft having lever arms at its respective ends connected respectively to said pedal and to the clutch, said spring and pedal arm being so arranged with reference to the pedal that the effective load of the spring against the pedal decreases during clutch release.

3. Mechanism for operating a friction clutch of a vehicle having a frame and a power plant and transmission unit of which the clutch forms a part, comprising a clutch release pedal pivoted to the frame, a pedal arm pivoted on the axis of said pedal and adapted to be engaged by said pedal during releasing movement, a spring, external of the clutch, for providing clutch engaging force, one end of said spring being attached to said pedal arm and the other being attached to the frame, and a transverse rock shaft having universally pivotal connections at its respective ends with the frame and said unit respectively, said rock shaft having lever arms at its respective ends connected respectively to said pedal and to said clutch, said spring and pedal arm being so arranged with reference to said pedal that the effective load of the spring against the pedal decreases during clutch release.

4. Mechanism for operating a friction clutch of a vehicle having a frame and a power plant and transmission unit of which the clutch forms a part, comprising a clutch release pedal, pivoted to the frame, a spring, external of the clutch, for providing clutch engaging force, one end of said spring being attached to said pedal, a transverse rock shaft having universally pivotal connections at its respective ends with the frame and said unit respectively, said rock shaft having lever arms at its respective ends connected respectively to said pedal and to the clutch, said pedal being so arranged relative to the spring that the effective load of the spring against the pedal decreases during clutch release.

5. Mechanism for operating a friction clutch of a vehicle having a frame and a power plant and transmission unit of which the clutch forms a part, comprising a clutch release pedal, pivoted to the frame, a pivoted pedal arm arranged to be engaged by the pedal during releasing movement, a spring, external of the clutch, for providing clutch engaging force, one end of said spring acting against said pedal arm and the other being attached to the frame, and a transverse rock shaft having universally pivotal connections at its respective ends with the frame and said unit respectively, said rock shaft having lever arms at its respective ends, a link connecting the outer of said arms to said pedal arm and a push rod connecting the inner of said arms to the clutch, said spring and pedal arm being so related to said pedal that the effective load of the spring applied to the pedal decreases during clutch release.

6. For operating a clutch including a pressure plate, a plurality of engagement levers arranged to transmit pressure to the pressure plate and a thrust bearing at the axis of the clutch for transmitting thrust to said levers, in a vehicle having a frame and a power plant and transmission unit of which the clutch forms a part; clutch operating mechanism comprising a spring, remote from the clutch, for providing clutch engagement pressure, a clutch release pedal for neutralizing the action of said spring so as to release the clutch, a pedal arm pivoted on the axis of said pedal and having a lost motion torque receiving connection therewith, a transverse rock shaft having universally pivotal connections at its respective ends with said frame and said unit respectively, a push rod connecting said pedal arm to the outer arm of said rock shaft, and a push rod connecting said inner arm of the rock shaft to the clutch, for transmitting clutch releasing pressure thereto, said spring and pedal arm being so related to said pedal that the effective load of the spring against the pedal decreases during clutch release.

7. Clutch operating mechanism as defined in claim 3, including yielding means for limiting return movement of the clutch pedal at a point separated from contact with the pedal arm and yielding means for biasing the pedal toward that position.

8. Mechanism for operating a friction clutch of a vehicle having a frame and a power plant and transmission unit of which the clutch forms a part, comprising a clutch release pedal pivoted to the frame and having a laterally projecting lug, a pedal arm pivoted on the axis of said pedal and adapted to be engaged by said lug during clutch releasing movement of the pedal, a spring, external of the clutch, for providing clutch engaging force, one end of said spring being attached to said pedal arm and the other being attached to the frame, means for limiting return movement of the pedal at a point where said lug is separated from contact with the pedal arm, means yieldingly biasing the pedal toward that position, and a transverse rock shaft having universally pivotal connections at its respective ends with the frame and with said unit respectively, said rock shaft having outwardly projecting lever arms at its respective ends, a link connecting the outer of said lever arms to said pedal arm, a push rod pivoted to the inner of said lever arms, and a rocking lever engaged by said push rod and adapted to transmit movement therefrom to the clutch, said spring and pedal arm being so related to said pedal that the effective load of the spring applied to the pedal decreases during clutch release.

HAROLD NUTT.